(12) United States Patent
Roulland et al.

(10) Patent No.: US 8,869,240 B2
(45) Date of Patent: Oct. 21, 2014

(54) SOFT METHOD FOR LOCAL SECURE CONNECTION TO A DEVICE

(75) Inventors: Frederic Roulland, Le Versoud (FR); Nicolas Hairon, Grenoble (FR); Ruhul Islam, Grenoble (FR); Yves Hoppenot, Notre-Dame-de Mesage (FR)

(73) Assignee: Xerox Corporation, Norwalk, CT (US)

( * ) Notice: Subject to any disclaimer, the term of this patent is extended or adjusted under 35 U.S.C. 154(b) by 240 days.

(21) Appl. No.: 13/305,037

(22) Filed: Nov. 28, 2011

(65) Prior Publication Data

US 2013/0139218 A1   May 30, 2013

(51) Int. Cl.
*H04L 29/00* (2006.01)

(52) U.S. Cl.
USPC ............... 726/3; 709/203; 709/229; 713/165

(58) Field of Classification Search
USPC ................ 709/203, 229; 713/165; 726/3
See application file for complete search history.

(56) References Cited

U.S. PATENT DOCUMENTS

| | | | |
|---|---|---|---|
| 7,505,607 B2 | 3/2009 | Meunier et al. | |
| 7,562,223 B2 | 7/2009 | Ragnet et al. | |
| 7,715,037 B2 | 5/2010 | Castellani | |
| 7,797,303 B2 | 9/2010 | Roulland et al. | |
| 7,941,665 B2 | 5/2011 | Berkema et al. | |
| 8,516,039 B2 * | 8/2013 | Brown et al. | 709/203 |
| 2006/0288206 A1 * | 12/2006 | Kojima | 713/165 |
| 2008/0126860 A1 | 5/2008 | Sampath et al. | |
| 2008/0294423 A1 | 11/2008 | Castellani et al. | |
| 2009/0319673 A1 | 12/2009 | Peters | |
| 2009/0322522 A1 | 12/2009 | Meunier | |
| 2010/0262696 A1 | 10/2010 | Oshiba | |

OTHER PUBLICATIONS

U.S. Appl. No. 12/967,210, filed Dec. 14, 2010, entitled "Method and System for Bridging Textual and Physical Concepts", by Frederic Roulland et al.

* cited by examiner

*Primary Examiner* — Brandon Hoffman
*Assistant Examiner* — Michael D Anderson
(74) *Attorney, Agent, or Firm* — Fay Sharpe LLP

(57) ABSTRACT

A system for pairing two devices includes a monitoring system and a server. The monitoring system receives a request made by a local submitter, such as servicing device or a technician operating the servicing device, for accessing diagnostic data of the monitoring system. The monitoring system initiates a request made to the server for connecting the monitoring system with the servicing device. The server generates pairing information and transmits the pairing information to the monitoring system. The server determines that a pairing key is received as input at the servicing device and/or monitored device and determines if the pairing key matches the pairing identification. If the server determines that there is a match, the server relays diagnostic data received from the monitoring system to the servicing device.

20 Claims, 5 Drawing Sheets

SOFT METHOD FOR LOCAL SECURE CONNECTION TO A DEVICE

BACKGROUND

The present disclosure is directed toward a system for providing a secure connection between two devices such that a first of the devices can transfer data to a second of the devices, such as diagnostic data, via a remote server.

In conventional repair procedures, a monitored device, such as a printer, provides diagnostic information to a remote service department via a communication link so that faults can be diagnosed. In some cases, a repair is performed by a technician, at the location of the device. In some cases, it is helpful for the technician to review the diagnostic data generated by the monitored device. However, there is a concern that unauthorized users may access the diagnostic or other data of the monitored device. Accordingly, a hard wired data connection is implemented for transmitting the data from the monitored device to the technician's servicing device, such as a mobile computer. Generally, the technician physically connects the two devices by urging a connection plug into data ports provided in both the monitored device and the servicing device. In this manner, the physical connection can alleviate security concerns regarding the exchange of data between the devices, by ensuring that the data can only be exchanged with a servicing device which is physically located in close proximity to the monitored device. However, this specific local connection may result in extra costs for the manufacturers of the devices as it may entail providing additional hardware components on the devices. Additionally, due to a lack of standardization, the use of supporting tools, such as, for example, personal mobile devices and software applications developed for use by the technician, may be limited.

There remains a need for a system that enables data to be transmitted between a monitored device and a servicing device without the need for implementing specific hardware while also maintaining security.

BRIEF DESCRIPTION

In accordance with one aspect of the exemplary embodiment, a monitoring system is adapted for transmitting diagnostic data. The monitoring system includes a communication device which includes at least one of an input device and an output device. The input device is adapted to receive, as input, at least one of an activation request and a pairing key provided by a local submitter. The output device is adapted to provide, as output, a pairing instruction to the local submitter for generation of the pairing key. The monitoring system further includes an activation module adapted to connect the monitoring system to a remote server. The monitoring system includes a pairing module in communication with the server and the communication device. The pairing module is adapted to receive pairing information generated by the server for forming a secure connection between the monitoring system and the servicing device via the server when the server recognizes that a pairing key has been submitted. The monitoring system further includes a data push module adapted to push diagnostic data to the server to be relayed to the servicing device when a secure connection between the monitoring system and the servicing device has been made. The monitoring system includes a processor adapted to implement the modules.

In accordance with another aspect of the exemplary embodiment, a method for connecting a monitoring system to a servicing device is provided. The method includes receiving an activation request for connecting the monitoring system to the server. The method further includes providing, to one of the monitoring system and the servicing device, pairing information generated by the server and determining that a pairing key has been submitted from the other of the monitoring system and the servicing device which matches the pairing information. A connection between the monitoring system and the associated servicing device is secured if the pairing key matches the pairing information. Diagnostic data is received from the monitoring system. The diagnostic data is relayed from the server to the servicing device via the secure connection.

In accordance with another aspect, a pairing system includes a monitoring system adapted to transmit a request to a server for creating a secure connection. A server in communication with the monitoring system is adapted to create a pairing session upon receipt of the request. The server is further adapted to generate pairing information corresponding to the pairing session and transmit the pairing information to one of the monitoring system and an associated servicing device. The monitoring system is adapted to transmit diagnostic data to the server, which relays the diagnostic data to the associated servicing device when the server determines that a pairing key received from the other of the monitoring system and the associated servicing device matches the pairing instruction.

DETAILED DESCRIPTION

The present embodiment is directed toward a system and method for providing a secure connection between first and second devices such that the second device can access internal data of the first device. A pairing system securely connects the two devices so that the first device can transfer data, including diagnostic data to the second device. The data can then be used by a technician or other user to provide the first device with technical support. The exemplary pairing system utilizes a pairing module that is adapted to receive pairing information generated by a remote server for effecting a connection of the first device (referred to herein as a monitoring system) and the second device (referred to herein as a mobile technical servicing device or simply a "servicing device") via the server, when the server recognizes that a pairing key, matching the pairing information, has been submitted.

As used herein, "pairing information" refers to information which is provided to the first device and/or second device by a remote server. A "pairing instruction" refers to information provided by the first device to the second device, or vice versa, and/or to a user of the second device, such as a technician. The pairing instruction enables a local submitter to submit a "pairing key" based on the pairing instruction. The second device and user are referred to herein as "local submitters" when they serve to submit the pairing key. A "pairing key" refers to information which is provided by a local submitter. The pairing key can be submitted to the remote server via one of the first device and the second device. In combination, the mode of pairing key submission, mode of pairing information provision, and/or mode of pairing instruction provision ensure that the local submitter is proximate the first device when the exchange of at least some of this information takes place. Assuming that the pairing key corresponds to ("matches") the pairing information, the secure connection between the first and second devices is made by the remote server. The connection is referred to herein as a soft connection because it makes use of an intermediate computing device, such as a server, to connect the two devices, avoiding the need for a hard connection, such as a cable.

As used herein, "local" or "co-located" refers to being in close proximity to the first device, e.g., within the same room or within a predetermined distance, such as from 5-10 meters. "Remote" means other than local, such as any location from which the first device is not readily touchable and/or visible.

Figure 1:
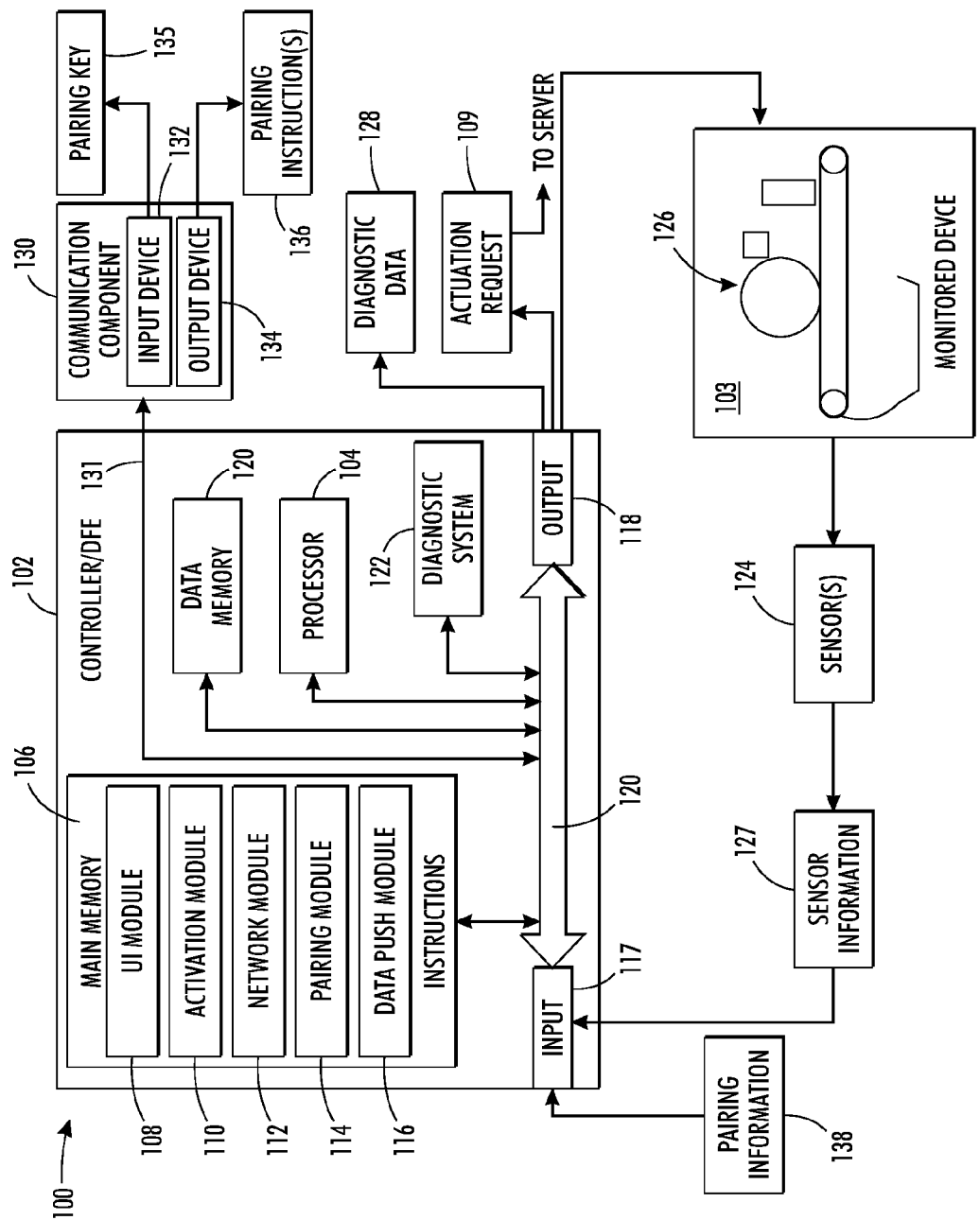
FIG. 1 is a schematic illustration of monitoring system included in one embodiment.
Figure 2:
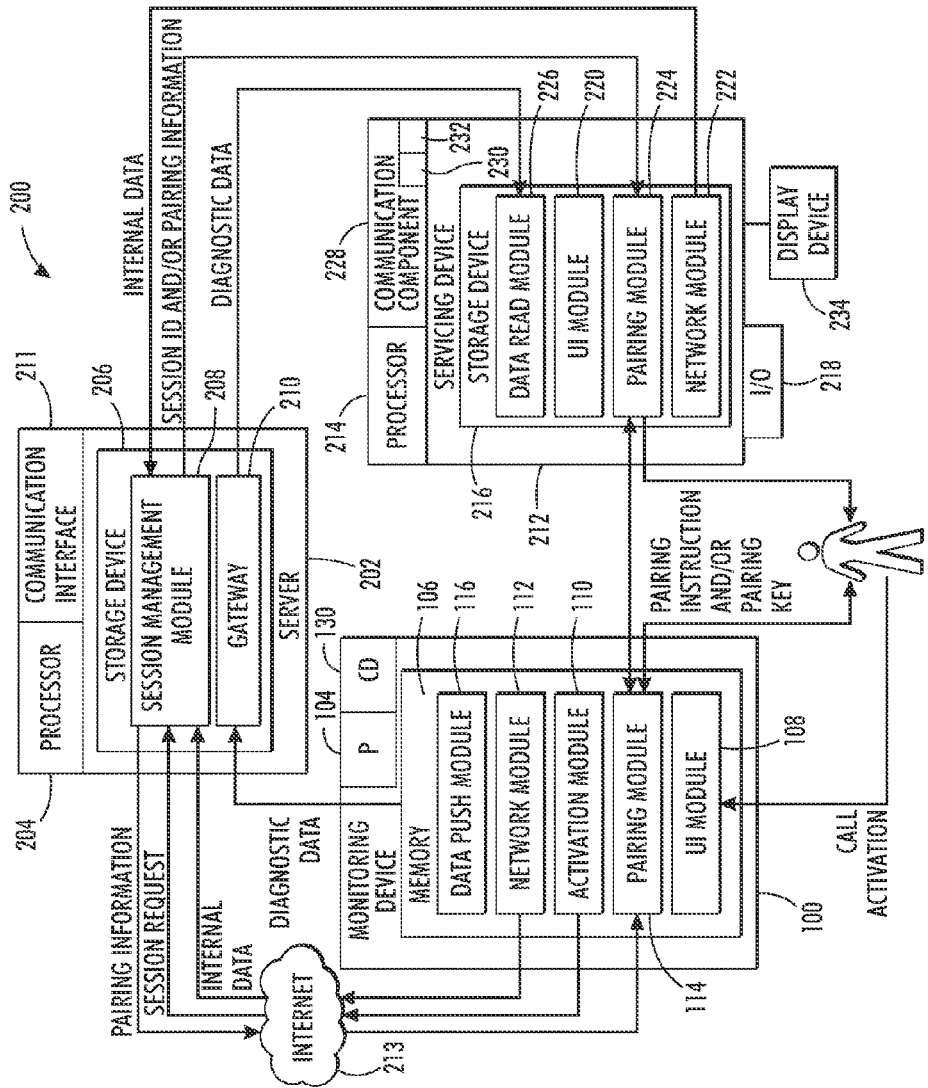
FIG. 2 is a schematic illustration of a pairing system according to another embodiment.

FIG. 1 is a schematic illustration of a monitoring system 100 in one exemplary embodiment. The monitoring system may form a part of a pairing system 200, as illustrated in FIG. 2, which further includes a server 202 and a servicing device 212, which are linked together by communication links 213, referred to herein as a network. These components are described in greater detail below.

The monitoring system 100 illustrated in FIG. 1 includes a controller 102 that is an integral part of or is closely associated with a monitored device 103, such as the illustrated image forming apparatus. The monitoring system controller 102 may include one or more special purpose or general purpose computing devices, such as a server computer or digital front end (DFE) of the image forming apparatus 103, or any other computing device capable of executing instructions for performing a part of the exemplary method.

The exemplary controller 102 is adapted for controlling an operation of at least one marking (or print) engine of the apparatus 103 for forming images on substrates. The image forming apparatus 103 renders images on print media, and can be a copier, laser printer, bookmaking machine, facsimile machine, or a multifunction machine (which includes one or more functions such as scanning, printing, archiving, emailing, and faxing). In other embodiments, the monitored device may be any other type of electromechanical device, such as a heating and cooling unit, refrigerator, dishwasher, or the like. Instruction data may be output from the controller 102 for further processing at the monitored device 103.

The controller 102 includes a processor 104, which controls the overall operation of the monitoring system 100 by execution of processing instructions, which are stored in memory 106 connected to the processor 104. The memory 106 may represent any type of tangible computer readable medium such as random access memory (RAM), read only memory (ROM), magnetic disk or tape, optical disk, flash memory, or holographic memory. In one embodiment, the memory 106 comprises a combination of random access memory and read only memory. The digital processor 104 can be variously embodied, such as by a single-core processor, a dual-core processor (or more generally by a multiple-core processor), a digital processor and cooperating math coprocessor, a digital controller, or the like. The digital processor, in addition to controlling the operation of the monitored device, executes instructions stored in memory 106 for performing the parts of the method outlined in FIG. 3 that are performed at the monitoring system 100. In some embodiments, the processor 104 and memory 106 may be combined in a single chip.

The monitoring system controller 100 may be integral with a networked image forming apparatus 103, although it is also contemplated that the controller 102 may be located elsewhere on a network to which the monitored device 103 is connected, such as on a server, networked computer, or the like, or distributed throughout the network 213 or otherwise accessible thereto. The pairing connection disclosed herein is performed by the processor 104 according to the instructions contained in the memory 106. In particular, the memory 106 stores a user interface (UI) module 108, which receives a user instruction for initiating a activation request 109 from the controller 102 of the monitoring system 100 to the server 202, an activation module 110, which connects the monitoring system to the server 202, and a network module 112, which transmits internal identification information associated with the monitored device 103 to the server 202 via network 213 for generating a pairing session for connecting the monitoring system 100 and the servicing device 212. A pairing module 114 receives pairing information generated by the server 202 for securing the connection between the monitoring system 100 and the servicing device 212. A data push module 116 pushes device data 128, such as diagnostic data to the server 202 to be relayed to the servicing device 212. The modules 108-116 will be later described with reference to the method. The data undergoes processing according to the various modules for generating pairing and fault repair sessions, which are stored in the data memory 106.

The software modules as used herein, are intended to encompass any collection or set of instructions executable by the monitoring system 100 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server 202 or other location to perform certain functions.

With continued reference to FIG. 1, the monitoring system controller 102 also includes one or more communication interfaces, such as network interfaces 117, 118, for communicating with external devices. The communication interfaces 117, 118 may include, for example, a modem, a router, a cable, and/or Ethernet port, etc. The various components of the monitoring system controller 102 may be all connected by a bus 120.

The monitoring system 100 may include a diagnostic system 122 adapted for receiving information from the monitored device 103 and using the information, for example, for detecting and identifying faults. The diagnostic system 122 is in communication with one or more sensors 124. For example, in the case of marking engines 126, sensors 124 may include attribute sensors which detect attributes of components of the monitored device 103, such as fuser roll temperature, nip roller speeds, electrical properties, sheet properties, and the like, while substrate/marking material sensors may detect toner coverage, toner concentration, image quality characteristics, such as gloss, image registration, color rendering, and substrate characteristics, such as paper arrival time, paper curl, paper damage, and the like. Environmental sensors may detect humidity and temperature. Sensors for advanced diagnostics and proactive fault management in the media path may include dedicated decision gate sensors, motor torque sensors, media type sensors, and media property sensors that measure moisture content and resistivity of print media. Marking path sensors may include full-width array (FWA) sensors located adjacent a portion of the print media path, for example, adjacent an intermediate transfer belt to sense properties before or after the image is transferred to the print media, or in a portion of the print media path which is common to all the marking engines. There is no limitation made herein to the type of sensor 124 or used herein.

The sensors transmit sensor information 127 directly or indirectly to the diagnostic system 122. The sensor information is used by the diagnostic system 122 for monitoring various components of the monitoring system 100. When a fault is detected which the monitored device 103 or controller 102 is unable to correct, the diagnostic system 122 is adapted to communicate diagnostic data 128 to the servicing device 212 that can be used by the technician in the repair or other action on the monitored device 103. In the exemplary embodiment, the diagnostic information is transmitted only after a secure connection is made between the monitoring system (e.g., controller 102 or device 103) and the servicing device 212. The exemplary pairing system 200 provides the secure connection between the monitoring system and the servicing device.

With continued reference to FIG. 1, the monitoring system 100 includes a communication device 130 which is communicatively connected with controller 102 via a wired and/or wireless link 131. In various embodiments, the communication device 130 may include one or more of a display device, for displaying information to users, and a user input device, such as a keyboard or touch or writable screen, for inputting instructions, and/or a cursor control device, such as a mouse, trackball, or the like, for communicating user input information and command selections to the processor 104. Specifically, the communication device 130 includes at least one of an input device 132 and an output device 134, both of which include hardware, and which are communicatively linked with the controller 102 via wired and/or wireless link(s) 131.

The input device 132 is adapted to receiving a pairing key 135 that is input locally by local submitter, such as the servicing device 212 or technician operating it. The output device 134 is adapted to output a pairing instruction(s) 136, which is based on pairing information 138 received by the controller 102 from the server 202. In this embodiment, pairing instructions are output in a manner which can be received by the local submitter, such as the servicing device 212 or technician operating it, and used to generate a pairing key 135.

When the controller includes the output device 134, the output device can include one or more of the following:

1. An electromagnetic radiation source which transmits a radiation signal towards the servicing device 212 or to the technician. In this case, the pairing instruction 136 includes a radiation signal, which is based on the pairing information 138 received from the server 202. The radiation source can include one or more lights, such as light emitting diodes (LEDs). The light or other radiation can be received by a radiation sensor of the servicing device, such as a sensor for sensing a radiation signal in a suitable range of the electromagnetic spectrum, e.g., visible, infrared, and/or UV, and a pairing key 135 is automatically generated by the servicing device, based thereon. The radiation signal can be a sequence of light flashes, which can be decoded automatically by the servicing device using, for example, a sensor, a scanner, or a camera in or in communication with the servicing device. Or the technician may observe the sequence of flashes, for example, as a Morse code, and input corresponding information 135 to the servicing device.

2. A loudspeaker which transmits an acoustic signal. In this case, the pairing instruction 136 includes an acoustic signal, such as a sequence of sounds, which is generated based on the pairing information 138 provided by the server. The acoustic signal may be machine detectable and/or hearable by a human. In the case of an audible signal intended to be heard by the technician, the output device 134 may further include a voice synthesis module for synthesizing words or other human interpretable sounds. In this case, the technician can input the words/characters heard as the pairing key 135 to a user input device on the servicing device 212 (or to input device 132). In the case of machine detectable sounds, the servicing device may include a microphone, which receives the sounds 136 and generates a signal based on the detected sounds, and the pairing key 135 is the signal or is automatically generated by the servicing device based thereon.

3. A marking engine, such as marking engine 126, which renders an image on print media, based on the pairing information 138 provided by the server. In this case, the pairing instruction 136 includes a rendered image. The pairing information 138, in this case, can be machine-readable and/or human readable information, such as an alphanumeric code or a bar code or two-dimensional code. In the case of a machine readable code, the servicing device 212 can include a reader, such as a barcode reader, adapted for capturing and reading the machine readable code and generating information on which the pairing key 135 can be based (which can, in one embodiment, be the same sequence). In the case of human readable information, such as an alphanumeric code, the technician can then manually enter the alphanumeric code as the pairing key 135 on a user input device of the servicing device.

4. A display device, which displays the pairing instruction 136 as a human-readable sequence of characters and/or a machine readable code, based on the pairing information 138 provided by the server. For example, the human-readable sequence can be an alphanumeric sequence such as a word or phrase or arbitrary sequence. In this embodiment, the user reads the human-readable sequence and enters it manually on a user input device of the servicing device (or the monitoring system), such as a keypad or touchscreen. In the case of a machine readable code, the code can be a barcode or two-dimensional code, such as a QR code. In this embodiment, the servicing device can include a reader, such as a barcode reader, adapted for capturing and reading the machine readable code and generating information on which the pairing key 135 can be based (which can, in one embodiment, be the same sequence).

When the controller includes the input device 132, the input device 132 can include one or more of the following:

1. A scanner for scanning a rendering of the pairing key. In this case, the pairing key 135 can be displayed on the display screen of the servicing device or may be rendered on a substrate, e.g., handwritten or printed. The scanner sends the scanned image or information generated therefrom (e.g., OCR'd text) to the pairing module 114 for comparing with the pairing information 138. The pairing key 135 can be a machine readable code, such as a bar code or two dimensional code, e.g., a QR code.

2. A microphone for receiving a specific audio signal such as sound provided by the servicing device 212 or spoken by the user. In this case, the pairing key 135 can be a predetermined sound, sequence of sounds, or spoken words. The sound recorded by the microphone, or information based thereon, can be sent to the pairing module 114 for comparing with the pairing information.

3. A mechanical sensor for sensing a sequence of actions performed on the monitored device 103. In this case, the pairing key 135 may include a predetermined sequence of actions in accordance with the pairing information 138 sent by the server to the servicing device (or to the controller 102 and output as pairing instructions by the output device 134). For example, a number of actionable parts are monitored by at least one internal sensor, such as sensor 124. The sensor can be adapted to sense manual actions performed on the monitored device 103 (or the communication device 130) by the user of the servicing device. The user can perform a predetermined sequence of actions on these parts. For example, the sensor senses when an access panel of the monitored device 103 is opened and closed a predetermined number of times meeting a predetermined threshold as specified in the pairing information/instructions and provided to the user either using the servicing device or the monitored device. Actions on two or more actionable parts in a predetermined sequence can also be specified. Movement of the parts can also be used to request activation of the pairing session.

4. A radiation sensor for sensing a radiation signal in a suitable range of the electromagnetic spectrum, e.g., visible, infrared, and/or UV. The pairing key can be a predetermined radiation signal transmitted from the servicing device. The radiation signal, or information based thereon, is compared by the pairing module with the pairing information received from the server. The radiation sensor can be, for example, a camera, which is adapted to receive radiation transmitted from the servicing device as a sequence of flashes.

5. A user input device for receiving a user input, which is input by the technician. The pairing key, in this case, can be an alphanumeric sequence, such as a predetermined series of digits, letters, or other characters. The user input device can be a touch screen or a key pad adapted to receive user entered inputs. The sequence may correspond to a human-recognizable pairing instruction displayed on the user input device or an associated display device.

In some embodiments the servicing device 212 includes a communication device 228 (FIG. 2) including at least one of an input and an output component, as discussed in further detail below. For example, the output component can be provided for outputting the paring instructions to the technician, based on pairing information provided by the server 202. The output component, in this case, can be configured similarly to any the output devices 134 described above, e.g., a loudspeaker, display device, or the like. In this embodiment, the technician inputs the pairing key to the input device 132. The input component can be provided for receiving the pairing key, and can be configured similarly to one or more of the input devices 132 described above, such as a keypad, touchscreen, scanner, camera, or the like. In some embodiments, for example, where the pairing instructions are provided by the output device 134, the pairing key is required to be input to the servicing device 212. In other embodiments, for example, where pairing instructions are sent to the servicing device 212 from the server 202, the pairing key is required to be input to the input device 132. This arrangement ensures that the pairing instructions are not output on the same device to which the pairing key is input. In this way, the pairing key cannot readily be submitted unless the servicing device 212 is local to the monitored device 103.

In some embodiments, however, the servicing device 212 can both output the pairing instruction and receive as input the pairing key by a mechanism which ensures that the servicing device is proximate the monitored device 103. For example, the servicing device 212 may be equipped with a camera adapted to transmit to the server 202 images of components in the monitored device 103 that the user captures in response to the pairing instruction/pairing information.

Accordingly, the pairing is enabled by a communication between the servicing device 212 and the monitoring system 100 and, more specifically, by the exchange of a pairing key 135 that can only be provided when the monitored device 103 is co-located with the servicing device 212 in order to ensure that only the servicing device can connect to the session. By way of example, the monitoring system 100 broadcasts the pairing instructions to the user, who will then use the pairing instructions for providing the pairing key by inputting the information contained in the pairing instructions into the servicing device 212. As another example, the servicing device 212 can broadcast a pairing instruction that the user then uses as a pairing key by inputting the information contained in the instruction into the monitoring system 100.

The exemplary monitored device 103 of the monitoring system 100 is an image forming apparatus. The image forming apparatus includes a marking engine 126 which applies marking medium, such as ink or toner, to a substrate, such as paper, using, for example, a laser, inkjet, thermal, or other transfer process.

With reference to FIG. 2, the pairing system 200 includes a server 202 in communication with the monitoring system 100. The server 202 includes a processing device 204 and memory, such as storage device 206, or has access to a storage device 206, for storing software modules executable by the processing device 204. The storage device 206 stores software instructions for implementing the server-side parts of the exemplary method shown in FIG. 3. In particular, the instructions include a session management module 208, which initiates a session upon receipt of an activation request 109 and generates pairing information for providing to at least one of the monitoring system 100 and the servicing device 212, and a gateway module 210, which relays diagnostic data received from the monitored device 103 to the servicing device 212. The server 202 further includes a communication interface 211 including hardware and/or software suitable for providing wired or wireless data communication with the monitoring system 100 and the servicing device 212. The memory 206, processor 204, and communication interface 211 can be similarly configured to memory 106, processor 104, and input/output devices 117, 118 of monitored device controller 102.

The pairing system 200 further includes a servicing device 212 in communication with the server 202. The exemplary servicing device 212 is a mobile device, such as a handheld computer, personal digital assistant (PDA) cellular phone, or microcomputer, which the technician can carry to the site at which the generally stationary monitored device 103 resides. The servicing device 212 includes a processor 214, such as a CPU, memory, such as storage device 216 and/or access to the storage device 216 for storing software modules executable on the processor of the CPU (the storage device 216 or a portion thereof may be included with the CPU), and a communication interface 218 including hardware and/or software suitable for providing wireless data communication with the server 202. The memory 216, processor 214, and communication interface 218 can be similarly configured to memory 106, processor 104, and input/output devices 117, 118 of monitoring system 100. The exemplary software modules include a U/I module 220, which receives notification of a server-generated pairing session created by the server 202, a networking module 222, which transmits internal identification information associated with the servicing device 212 to the server 202 via communication link 213, such as a wired and/or wireless network, such as the Internet, for generating the session for connecting the servicing device and the monitoring system. A pairing module 224 receives the pairing information 138 provided by the server 202 and/or pairing instructions 136 broadcast from the monitoring system communication device 130 and/or provides the pairing key 135 to the monitored device communication device 130 for securing the connection between the monitoring system and the servicing device. A data read module 226 reads the diagnostic data 128 pushed by the monitored device. These modules 220-226 will be later described with reference to the exemplary method. The data 128 may undergo processing by the servicing device and may be stored in the data memory of storage device 216 and displayed to the technician in a suitable form on a display device 228 of the servicing device 212.

With continued reference to FIG. 2, the servicing device 212 further includes a communication component 228. The communication component 228 includes at least one of an input component 230 and an output component 232, analogous to input and output devices 132, 134, discussed above. The input component may be adapted to receive a server-generated pairing instruction broadcast from the monitoring system communication device 130 or provided by the monitoring system communication device 130 to the user, as discussed above.

The exemplary communication device 130 and communication device 228, which are integral with or closely associated with the monitored device 103 and the servicing device 212, respectively, cooperate to provide a pairing system 200 in which the monitoring and servicing devices 128, 212 are required to be co-located for a pairing to be formed. In other words, the session management module 208 of the server 202 transmits pairing information that can only be used by the user of the servicing device 212 at the location of the monitored device 103 by entering the information displayed on the monitored device communication device 130 into the servicing device 212 or by receiving on the servicing device 212 the information broadcast from the monitored device communication device 130 and providing the information to the respective communication device of the servicing or the monitored device 103, 212 depending on the devices' configurations.

The pairing system is enabled using the communication devices 130, 228 formed on each of the monitoring and the servicing devices 128, 212. The communication devices 130, 228 are each in communication with the server 202. In this manner, the communication device 130 of the monitoring system 100 is adapted to provide the pairing information to the servicing device 212 and/or receive the pairing key from the servicing device 212. The pairing key/pairing instruction is based from the pairing information generated by the server 202, which is also in communication with the pairing modules of each respective monitoring and servicing device 103, 212.

Generally, the controller 102 of monitoring system 100 transmits a request 109 to the server 202 for creating the secure connection. Upon receipt of the request 109, the server, which may also be in communication with the monitored device 103 itself, and/or with diagnostic system 122, creates a diagnostic session and transmits pairing session identification information and pairing information to at least one of the controller of monitoring system 100 and the servicing device 212. The pairing information corresponds to the pairing key that must be provided, e.g., by the servicing device 212, to secure the connection. When a pairing key 135 matching the pairing information is received, the monitored device 103 is adapted to transmit internal diagnostic data to the server 202, which relays the data to the servicing device 212 for purposes of remedying the fault.

Figure 3A:
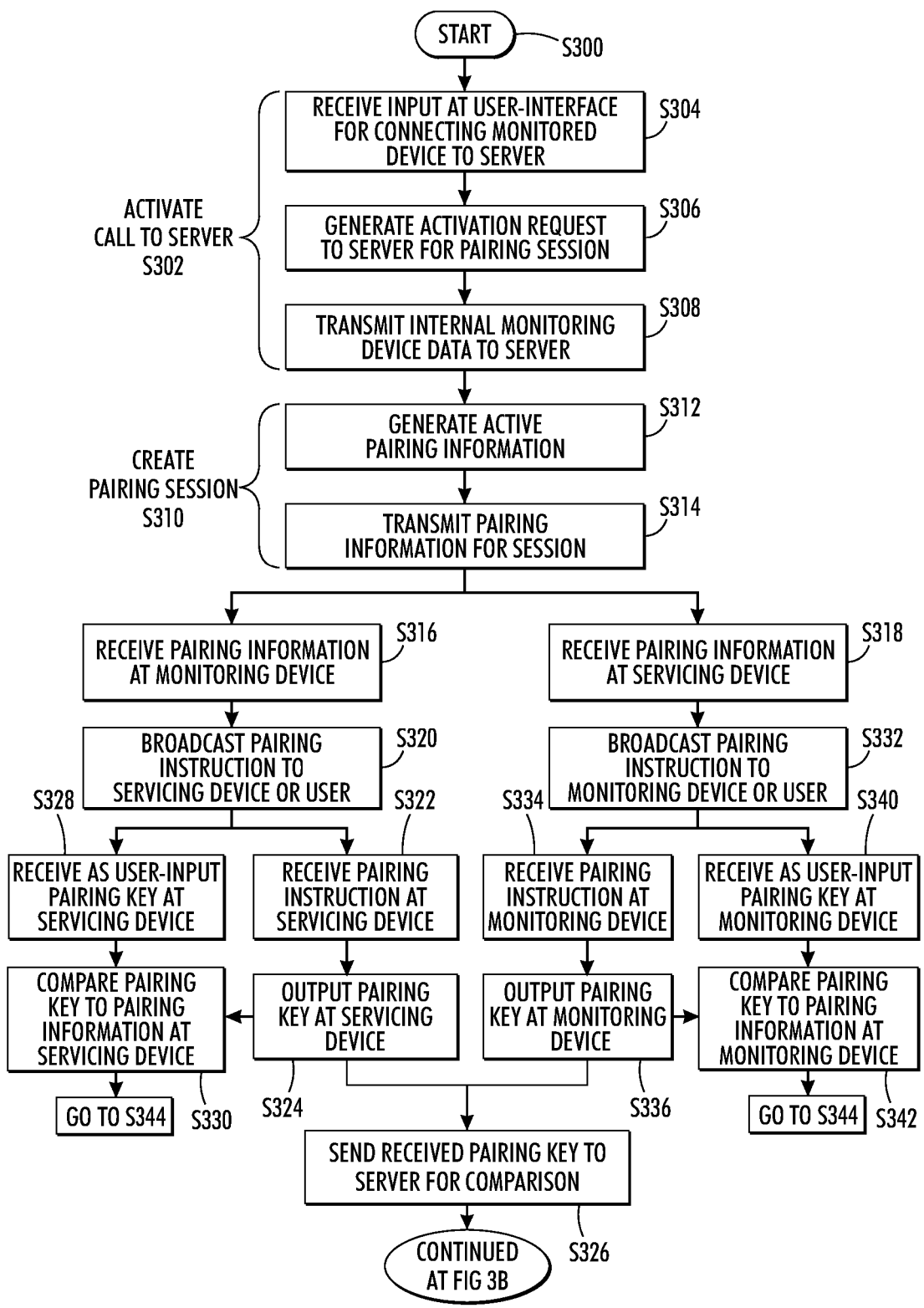
FIGS. 3A and 3B show a flow chart illustrating an exemplary pairing method according to another embodiment.
Figure 3B:
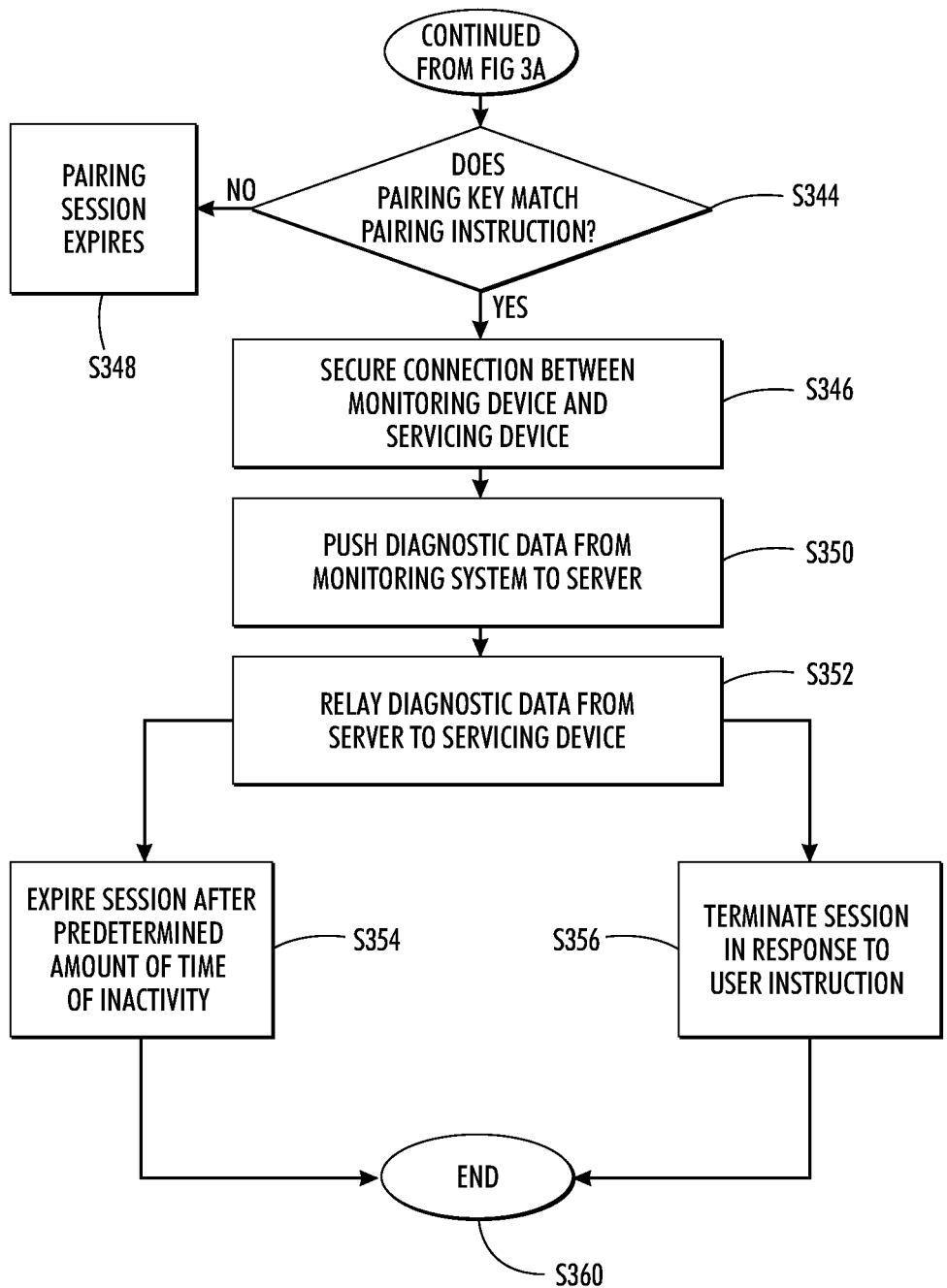

FIGS. 3A and 3B illustrate a method for creating a secure connection between the monitoring system 100 and servicing device 212. In general, two distinct actions are involved: an activation request provided from (or through) the monitoring system 100 and a pairing created with the servicing device 212.

The method starts at S300. A request, such as a maintenance or repair call, is initiated from or through the monitoring system 100 at S302. At S304, the user input device 132 receives a request made by the user for connecting the monitored device to the server. For example, when the input device includes a user input device, the monitoring system may receive input via a graphical user interface, such as a touch screen, keypad, or the like for initiating the request. In one embodiment, the user can activate the activation request from a soft button on the touch screen or by pressing a sequence of keys on the keypad. Where the input device 132 includes a scanner, the user can scan a machine-readable code which is printed on a sheet of paper or displayed on the display of the servicing device. Where the input device 132 includes a microphone, the user can activate the activation request 109 by pronouncing a sentence or by playing a specific audio signal selectively emitted from the servicing device 212. Where the input device 132 includes a mechanical sensor, the user can perform a sequence of predetermined actions on the actionable parts that will activate the activation request 109. For instance, the activation request can be triggered when an access panel of the monitored device is (e.g., manually) opened and closed a predetermined number of successive times.

In yet another embodiment, a sensor on the monitored device 103 can determine that a request to connect to the server 202 is being made when it receives a transmission indicating that the mobile servicing device 212 has come into proximity of the monitored device 103. In another embodiment, the monitoring system 100 can automatically initiate the request if a certain proximity and/or time threshold is met.

In the exemplary embodiment, the activation request 109 can only be initiated from the monitored device 103 (e.g., from its co-located communication device 130). The system 202 thus ensures that the user and the mobile servicing device 212 are physically located at the monitored device 103. One objective for having the monitoring system 100 initiate the activation request is to create a session instance on the server 202. Generally, the user of the servicing device 212 is registered to the server. The monitored device 103/system 100 and the servicing device 212 are also registered with the server 202 for being able to selectively make the connection. In one embodiment, the session created by the activation request 109 may include a secure web page made selectively accessible to the user using the servicing and/or monitored devices 212, 103.

After the monitoring system 100 determines that the user has requested maintenance or repair at S306, the activation module generates or activates an activation request or "call" 109 to the server 202 for requesting a pairing instruction. The network module 112 can transmit internal data to the server via network 213 at S306 for initiating the session. This internal data may include, for example, device model information. If any device data is sent at this time, it is held at the server 202 and is not transmitted to the servicing device 212. The server 202 creates a session at S308. At S310, the session management module 208 creates a pairing session for connecting the monitored device/system and the servicing device 212. The server 202 generates an active (e.g., single-use) pairing information specific to only the session, at S312.

The server transmits the server-generated pairing information corresponding to the active session at S314 and waits to receive an indication that a pairing key is received at one of the monitoring system 100 and the servicing device 212. More specifically, the server transmits the pairing information at S314 to at least one of the pairing modules 114, 224 of the monitoring and servicing devices that is/are in communication with the server. In one embodiment, the pairing information is received at the monitoring system at S316. In another embodiment, the pairing information is received at the servicing device at S318. If the pairing information is received at the monitoring system, the monitored device communication device 130 then broadcasts or otherwise provides the pairing instruction to the servicing device or user at S320. At S322, the pairing instruction is received by the servicing device and the servicing device automatically generates a pairing key at S324 and sends it to the server at S326 which compares the pairing key with the pairing information. If the pairing instruction is received by the user, at S328 the user generates a pairing key and inputs it to the servicing device which may compare the key with the pairing information at S330 or send the pairing key to the server to do so at S326. Similarly, if the pairing information is received by the servicing device at S328, the servicing device then broadcasts the pairing instruction to the monitoring device communication device 130 or user at S332. If at S334, the pairing instruction is received at the monitoring system, the monitoring device automatically operates a pairing and sends it to the server at, and at S336 the monitoring system may compare the key with the pairing information at S342 or send the pairing key to the server to do so at S326. If the pairing instruction is received by the user, at S340, the user generates a pairing key and inputs it to the monitoring system which may compare the key with the pairing information at S342 or send the pairing key to the server at S326 to do so. Example pairing instructions are discussed above.

In one exemplary embodiment, the monitoring system is adapted to output pairing instructions 136 according to its configuration and the servicing device is adapted to receive the pairing instructions/pairing key.

With continued reference to FIG. 3, in an example embodiment, the pairing module 114 in communication with the communication device 130 receiving the pairing key transmits the pairing key to the server at S326. The server session management module 208 determines whether the received pairing key matches the server-generated pairing instruction at S344.

With continued reference to FIG. 3B, if a match is determined, a secure connection is formed between the monitoring system 100/device 103 and the servicing device 212 at S346. If no match is determined, the secure connection is not formed and data is prevented from being transmitted from the monitoring system to the servicing device. Furthermore, in one contemplated embodiment, the session management module causes the pairing session to expire at S348 if it does not receive an indication that a pairing key is received at the select monitoring or servicing device 103, 212 within a predetermined time threshold.

In another contemplated example, the server 202 may initiate a time-out for creating the pairing session once it receives the activation request 109. Pairing information 138 is sent back to the monitoring system in the same manner described above. However, the session management module 208 of the server can cause the pairing instruction to expire after the predetermined time if no pairing key 135 is received within that time period. In this manner, the pairing information can be active for a reasonable amount of time, for example, approximately one or several minutes, to allow the user to provide the pairing key.

With continued reference to FIG. 3B, the server enables the transmission of data between the monitored device 103/system 100 and the servicing device 212 once the match is made. In this manner, the monitoring system 100 pushes diagnostic data 128 to the gateway 210 of the server at S350. Using the gateway, the server relays the diagnostic data to the servicing device 212 at S352. The servicing device then assists the user in maintaining and repairing the monitored device 103 in a conventional manner, e.g., by displaying analyzing, or otherwise processing the diagnostic data.

Therefore, once the request 109 is activated and the two devices are paired, the connection is established between the two devices through the server and the monitored device 103/controller 102 starts to push its data 128 to the user's device 212. In addition to the connection protocol described above, an authentication of the technician can be optionally added in order to provide the access to the system only to a restricted list of authorized users. In some embodiments, the server may permit data to flow from the servicing device to the monitored device/system via the gateway 210 for effecting, for example, a software repair.

Generally, the active pairing session can expire after a predetermined time of inactivity at S354. In another embodiment, the user can request the session be terminated using the UI interface on at least one of the monitoring and servicing devices at S356. The method ends at S360.

Although the control methods are illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system, wherein the disclosure is not limited to the specific applications and embodiments illustrated and described herein.

The method illustrated in FIGS. 3A and 3B may be implemented in a computer program product that may be executed on the monitoring system 100. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The pairing method provided in the present disclosure enables the monitoring system to form a connection with the user's servicing device by the exchange of a key that may be required to occur physically through the user in order to ensure that only the user's servicing device can connect to the pairing session. In one example embodiment, either the monitoring system outputs the pairing instruction to the user who will then input the matching pairing key into the user's servicing device or the user's servicing device outputs a pairing instruction that the user will then input as matching pairing key into the monitoring system.

Example Implementation

Figure 4:
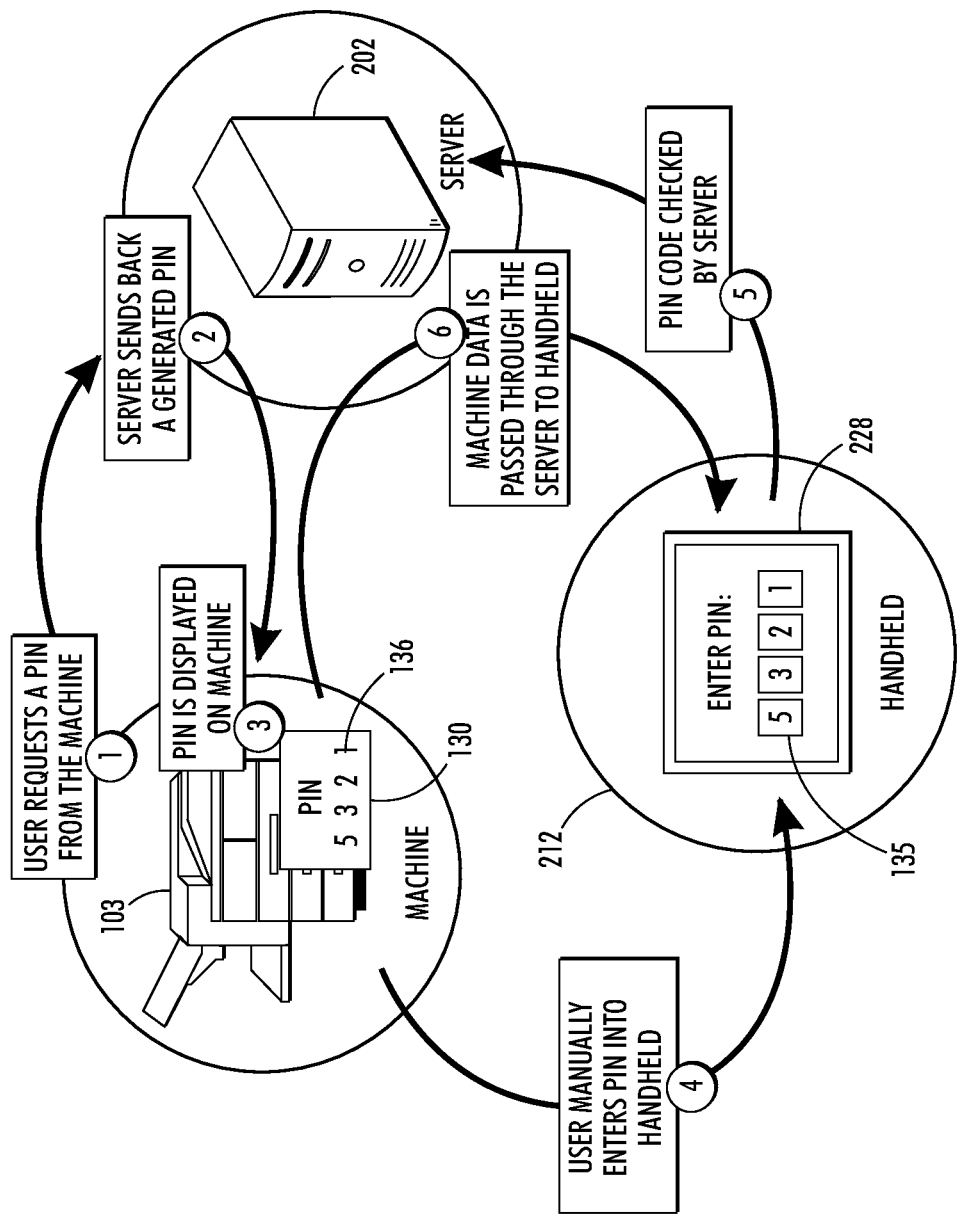
FIG. 4 is an illustrative implementation of the method according to another embodiment.

An example of a pairing method is illustrated in FIG. 4. FIG. 4 illustrates an image forming apparatus as the monitored device 103. As mentioned, a user positions himself/herself in proximity of the image forming apparatus 103 with a servicing computer device 212. The user requests a pin 136 from the image forming apparatus. As earlier discussed, the user can, in one example, initiate the activation request 109 using the graphical user interface 130 on the image forming apparatus. The activation request is sent to the server, which next generates a pin 138 and sends it back to the image forming apparatus. This pin is representative of the pairing information. The server-generated pin (now the pairing instruction 136) is displayed on the image forming apparatus. In the illustration, the server-generated pin 136/138 includes the numeric sequence "5321". The user manually enters the pin (now the pairing key 135) into the handheld user interface 228, 230, on the servicing computer device 212. In this manner, the user and the servicing computer device 212 are co-located with the image forming apparatus 103 because the apparatus 103 displays the server-generated pin 136, 138 that must be input into the servicing computer as the pairing key 135 in order for the pairing connection to be made. In this illustrated example, the input pin number 135 is transmitted to the server, which determines if the input pin (i.e., pairing key 135) matches the server-generated pin 138 (i.e., pairing information). If a match is determined, a secure connection is ensured and the image forming apparatus is adapted to pass diagnostic data through the server to the servicing computer.

In summary, the pairing and diagnostic systems disclosed herein provide for an exchange of device data 128 through an external communication server 202. The monitored device controller 102 is connected to a network 213 and can therefore access the server 202. In addition to its UI module 108 and network module 112, which can be conventional components, the monitored device controller contains additional software modules 110, 114, 116 for being able to push its internal data 128 to the server and for handling activation and pairing actions. The server includes a first module 208 in charge of managing the session that connects the monitoring and servicing devices. A second module 210 acts as a gateway to stream the data 128 coming from the monitored device to the servicing device 212. The servicing device includes a network module 222 for interacting with the server and a UI module 220 for interacting with the user. The servicing device contains a module 226 that reads the data 128 coming from the monitored device and a module 224 for handling the pairing action.

One aspect of the present disclosure is a pairing system that does not require a dedicated physical connection between a port and the servicing device. The user can access the monitored device data without connecting the servicing device to this port. Furthermore, the disclosure requires no additional hardware in the form of, for example, Bluetooth adapters contained in the monitored device, for allowing direct connection of the monitored device with other close devices that are also Bluetooth enabled. Accordingly, the system and method provided herein ensures that the user and the servicing device connecting to the monitored device are physically located in front of the monitored device.

Another aspect is that the pairing system includes a server. Accordingly, the servicing device does not need to address the monitored device directly, but rather can pair with the monitored device 103/monitoring system 100 across different networks.

Another aspect of the present disclosure is a pairing system 212 that lowers manufacturing costs for the monitored device because no specific hardware is required for maintenance operations. When combined with software extensibility platforms, the present system and method can also be used to deploy generic maintenance applications on a large fleet of devices with heterogeneous connectivity and UI capabilities. For instance, one application can include synchronizing a shared representation of the monitored device 103, between a remote help desk and a user at the device UI 130, with the actual status of the monitored device made available through the reading of the device sensors 124. The system and method provide the ability to apply such an application to monitored devices which do not include a UI able to support it. The exemplary system is adapted to providing limited access to diagnostic and internal data 128 of the monitored device 103. Conventional connections tend to provide the user of the servicing device with unlimited access to monitored device data. The server 202 may be adapted to filter the data and only relay selective data to the servicing device 212.

Another aspect of the pairing system disclosed herein is that the monitoring and servicing devices are not limited to pairing only on a one-to-one basis, but also potentially on a 1-n, n-1, or n-to-n basis, where n is a number greater than 1.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A monitoring system comprising a monitored device for transmitting diagnostic data, the monitored device including:
   a communication device including at least one of an input device and an output device, the output device for communicating a pairing instruction to an associated local submitter, the input device or receiving as input a pairing key provided by an associated local submitter in response to the pairing instruction;
   an activation module for connecting the monitoring system to an associated remote server;
   a pairing module in communication with the associated server and the communication device, the pairing module for receiving pairing information generated by the associated server before the communication device communicates the pairing instruction to the associated local submitter for forming a secure connection between the monitoring system and an associated servicing device via the associated server;
   a data push module for pushing diagnostic data for a monitored device of the monitoring system to the associated server to be relayed to the associated servicing device when the secure connection between the monitoring system and the associated servicing device has been made; and
   a processor for implementing the modules;

wherein the associated local submitter is one of the associated servicing device and a user of the associated servicing device and the pairing module can receive the pairing key from the associated servicing device only when the associated servicing device is co-located with the monitored device of the monitoring system.

2. The monitoring system of claim 1, wherein the input device receives as input the pairing key provided by an associated local submitter and the pairing module further receiving the input pairing key and forming the secure connection if the pairing key matches the pairing information generated by the associated server.

3. The monitoring system of claim 1, wherein the communication device includes the input device and the input device receives the pairing key from the associate servicing device.

4. The monitoring system of claim 1, wherein the pairing instruction includes human recognizable information and the communication device includes the input device for receiving a user-entered alphanumeric sequence corresponding to the human recognizable information.

5. The monitoring system of claim 1, wherein the communication device includes the input device for receiving the pairing key.

6. The monitoring system of claim 5, wherein the input device is selected from a group consisting of:
   a scanner for scanning a device screen on the associated servicing device and wherein the pairing key is displayed on the screen;
   a microphone for receiving a sound provided by the associated servicing device and wherein the pairing key comprises a predetermined sound;
   a sensor for sensing a sequence of actions performed on the monitored device in accordance with the pairing information generated by the associated server and wherein the pairing key comprises a predetermined sequence of actions;
   a radiation sensor for sensing radiation signal transmitted from the associated servicing device and wherein the pairing key comprises a predetermined radiation signal; and
   a combination thereof.

7. The monitoring system of claim 1, wherein the communication device includes the output device, the output device generating the pairing instruction based on pairing information received from the associated server.

8. The monitoring system of claim 7, wherein the output device is selected from the group consisting of:
   a radiation source for transmitting a radiation signal towards the associated servicing device, and wherein the pairing instruction comprises a radiation signal;
   a speaker for transmitting an acoustic sequence and wherein the pairing instruction comprises an acoustic sequence;
   a marking engine for rendering an image and wherein the pairing instruction comprises a rendered image;
   a display device for displaying the pairing instruction in at least one of human and machine readable form; and
   a combination thereof.

9. The monitoring system of claim 1, wherein the pairing module for providing the pairing information to the communication device.

10. The monitoring system of claim 1, wherein the activation module
    communicates with the associated server for initiating a pairing session and
    requests that the pairing information be generated by the associated server.

11. The monitoring system of claim 1, further comprising:
    a user-interface module for receiving a user instruction for initiating an activation request from the monitoring system to the associated server.

12. The monitoring system of claim 1, wherein the monitored device includes an image forming apparatus.

13. The monitoring system of claim 1, further including a diagnostic system in communication with the data push module, the diagnostic system for communicating diagnostic information from the monitored device to the data push module.

14. The monitoring system of claim 1, further comprising:
    a network module for transmitting internal identification data associated with the monitored device to the associated server for generating a session for connecting the monitoring system and the associated servicing device.

15. A pairing system comprising the monitored device of claim 1 and a server, the server including:
    a communication interface for transmitting the pairing information to at least one of the monitoring system and the associated servicing device;
    a session management module for creating a pairing session upon receipt of an activation request and for generating the pairing information;
    a gateway module for receiving the diagnostic data from the monitoring system and relaying the diagnostic data to the servicing device in response to a pairing key received at a second one of the monitored device and the associated servicing device matching the pairing information generated by the session management module; and,
    a processor adapted for implementing the modules;
    wherein the associated local submitter is one of the associated servicing device and a user of the associated servicing device and the pairing module can receive the pairing key from the associated servicing device only when the associated servicing device is co-located with the monitored device of the monitoring system.

16. A method for connecting a monitored device to a servicing device, the method comprising:
    receiving an activation request at a server for connecting the monitored device to the server;
    providing, to one of the monitored device and the servicing device, pairing information generated by the server;
    determining, by the server, that a pairing key has been submitted from the other of the monitored device and the servicing device which matches the pairing information, wherein the pairing key is submitted only when the servicing device is co-located with the monitored device;
    securing a connection between the monitored device and the servicing device if the pairing key matches the pairing information;
    receiving diagnostic data from the monitored device at the server; and
    after securing the connection, relaying the diagnostic data from the server to the servicing device via the secure connection.

17. A computer product comprising a non-transitory recording medium storing instructions which, when executed, perform the method of claim 16.

18. A pairing system comprising:
    a monitored device for transmitting a request to a server for creating a secure connection;
    a server in communication with the monitored device for creating a pairing session upon receipt of the request, the server further generating pairing information corresponding to the pairing session and transmitting the pairing information to one of the monitored device and an associated servicing device co-located with the monitored device;

the monitored device being further transmitting diagnostic data through the server, which relays the diagnostic data to the associated servicing device when the server determines that a pairing key received from the other of the monitoring system and the associated servicing device matches the pairing information.

19. The pairing system of claim 18, wherein the monitored device receives a request made by a local submitter for accessing diagnostic data of a monitored device of the monitoring system, the local submitter comprising at least one of the associated servicing device and an operator thereof; and wherein the monitored device initiates a request to the server for connecting the monitoring system with the associated servicing device.

20. The pairing system of claim 19, wherein the monitored device is further for broadcasting the pairing instruction to the local submitter.

* * * * *